Patented Apr. 10, 1951

2,547,961

UNITED STATES PATENT OFFICE 2,547,961

LOWER ALKYLMERCAPTOALKANOATES OF HYDROXYLATED HORMONES AND METHOD OF PRODUCING SAME

Aram Mooradian, Troy, Elmer J. Lawson, East Greenbush, and Chester M. Suter, Albany, N. Y., assignors to Sterling Drug Inc., Wilmington, Del., a corporation of Delaware No Drawing. Application September 13, 1947, Serial No. 773,943

21 Claims. (Cl. 260—397.4)

This invention relates to a new class of esters of hydroxylated hormones, namely the lower alkylmercaptoalkanoates, and to a method of preparing the same. More particularly, it relates to such esters of testosterone.

Ever since early workers in the field found that certain esters of androgenic hormones had a greatly prolonged duration of action, in contrast to the transient action of the parent hydroxysteroids, intensive research programs have been aimed at finding more efficacious esters and other derivatives of sex and cortical hormones, in general, and of testosterone in particular. In spite of the intensified effort to find suitable derivatives the list of effective esters and other derivatives satisfactory for clinical use still remains surprisingly small; in fact, at the present time, only a few esters, notably the propionate, are available to the public for hormone therapy.

In its broader aspects, our invention comprehends lower alkylmercaptoalkanoates of hydroxylated hormones, which in general show a much more marked and sustained activity than the free hormones. Our new compounds have the structure Y(O—CO—X—S—R)$_n$ where Y(OH)$_n$ is a hydroxy compound having sex or cortical hormone activity such as testosterone, estradiol, estrone, stilbestrol, or desoxycorticosterone, so that Y is the radical left after removing the n-hydroxyl groups, X is lower alkylene, and R is lower alkyl.

In particular, we have found that testosterone alkylmercaptoalkanoates of the formula

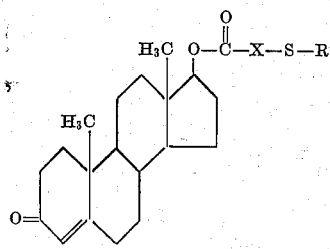

wherein R is a lower alkyl radical and X is a lower alkylene radical, have a pronounced and sustained androgenic activity, comparing favorably with the most potent testosterone esters currently used.

In the general formula given above, R is a lower alkyl radical preferably having no more than four carbon atoms, such as methyl, ethyl, 2-propyl, n-butyl, and the like, X is a lower alkylene radical preferably having no more than three carbon atoms, such as methylene, ethylene, trimethylene, 1,1-ethylene, 2,2-propylene, 1,1-propylene, and 1,2-propylene. Examples of such testosterone esters include: the methylmercaptoacetate, the ethylmercaptoacetate, the n-propylmercaptoacetate, the n-butylmercaptoacetate, the 3-(2-propylmercapto)propanoate, the 4 - (n - propylmercapto)butanoate, the 2-methylmercaptopropanoate, the 2 - ethylmercaptobutanoate, the 3 - (n - propylmercapto)butanoate, and the like.

The compounds of our invention are conveniently prepared by the reaction of testosterone with either an alkylmercaptoalkanoyl halide of the general formula, R—S—X—CO-halogen, wherein R and X have the same meanings as given above, in the presence of an appropriate basic substance, or a corresponding alkylmercaptoalkanoic anhydride in the presence of a base such as pyridine or fused potassium acetate. In practicing our invention we prefer to use, as the basic substance in the acid halide method of preparation, a tertiary amine such as pyridine, which not only acts as an acceptor for the hydrogen halide liberated by the reaction but also acts as a solvent for the reactants.

The above-mentioned alkylmercaptoalkanoyl acid halides are conveniently prepared from the corresponding alkylmercaptoalkanoic acids by the various methods used to conver aliphatic carboxylic acids into acid halides, such as, by treating the acid with phosphorus trichloride, thionyl chloride, etc. The alkylmercaptoalkanoic acids are conveniently prepared by a variety of methods. In one method, the corresponding mercaptoalkanoic acid is treated with an alkylating agent, e. g., a dialkyl sulfate, an alkyl halide, etc., under alkaline conditions. For example, ethylmercaptoacetic acid is formed by heating mercaptoacetic acid with diethyl sulfate in the presence of sodium hydroxide. In another method, a haloalkanoic acid is treated with an alkanethiol under alkaline conditions. In such a manner, 2-methylmercaptobutanoic acid is formed by treating 2-bromobutanoic acid with methanethiol and sodium hydroxide.

The alkylmercaptoalkanoic anhydrides described above can be prepared by refluxing a solution of the corresponding alkylmercaptoalkanoic acid with an excess of acetic anhydride.

As already indicated, our invention contemplates alkylmercaptoalkanoates of hydroxylated hormones in general, such as: other androgens, e. g. 17-methyltestosterone, etc.; estrogens, e. g. estrone, estradiol, stilbestrol, etc.; and adrenal cortical hormones, e. g. desoxycorticosterone, etc. Such esters include 17 - methyltestosterone 3 - methylmercaptopropanoate, estrone n - propylmercaptoacetate, stilbestrol di(ethylmercaptoacetate), desoxycorticosterone 4-methylmercaptobutanoate, and the like.

The compounds of our invention are further illustrated by the following examples. It is to be understood that our invention is not limited to these examples but only by the scope of the appended claims.

I. ALKYLMERCAPTOALKANOIC ACIDS

These intermediate compounds can be prepared by various means. We have found useful the following methods: A, alkylation of a mercaptoalkanoic acid; and B, treatment of a haloalkanoic acid with an alkanethiol under alkaline conditions. Specific examples of these methods follow:

*Procedure A.* — *2 - methylmercaptopropanoic acid.*—To a solution of 51.5 g. of sodium hydroxide in 690 ml. of water is added with stirring and cooling 69.4 g. of 2-mercaptopropanoic acid. To the resulting solution, kept between 20–25° C., is added dropwise with stirring 94.5 g. of dimethyl sulfate. After the reaction mixture has been stirred for one hour, it is made acidic with dilute hydrochloric acid and extracted with ether. After evaporation of the ether in vacuo, the residue is distilled, yielding a fraction of the desired product, 2-methylmercaptopropanoic acid, distilling at 112–5° C. at 12 mm.

The corresponding 3-methylmercaptopropanoic acid, distilling at 119–23° C. at 12 mm., is prepared using the method described above, but substituting 3-mercaptopropanoic acid for 2-mercaptopropanoic acid. Similarly, 2-ethylmercaptopropanoic acid, distilling at 111–3° C. at 8 mm., is prepared from 2-mercaptopropanoic acid and diethyl sulfate.

*Procedure B.* — *2 - methylmercaptobutanoic acid.*—To a mixture of 14.4 g. of methanethiol, 125 ml. of 35% sodium hydroxide solution, and 125 g. of ice is added 33.4 g. of 2-bromobutanoic acid. The resulting cloudy solution is heated on the steam bath for two hours. The reaction mixture is then cooled, acidified, and extracted with ether. After removal of the ether by distillation, the residue is distilled, yielding 19 g. of 2-methylmercaptobutanoic acid, B. P. 115–6° C. at 9 mm.

Examples of other acids prepared by this method include: n-propylmercaptoacetic acid (from 1-propanethiol and chloroacetic acid, B. P. 126–8° C. at 11 mm.; (2-propyl)mercaptoacetic acid (from 2-propanethiol and chloroacetic acid), B. P. 118–9° C. at 10 mm.; n-butylmercaptoacetic acid (from 1-butanethiol and chloroacetic acid), B. P. 136–7° C. at 10 mm.; and the like.

A modification of this procedure is afforded by using, instead of the chloroalkanoic acids, the corresponding chloroalkanenitrile and a slightly longer (2½ to 3 hours) reflux period to assure complete hydrolysis of the nitrile group to the carboxyl group. In such a manner is prepared 4-methylmercaptobutanoic acid (from methanethiol and 4-chlorobutanenitrile), B. P. 129–30° C. at 9 mm., and 4-n-propylmercaptobutanoic acid (from 1-propanethiol and 4-chlorobutanenitrile), B. P. 141–2° C. at 7 mm.

II. ALKYLMERCAPTOALKANOIC ACID HALIDES

These compounds are conveniently prepared from the corresponding alkylmercaptoalkanoic acids by the various known methods used to convert aliphatic carboxylic acids into acid halides, such as by treating the acid with phosphorus trichloride, thionyl chloride, phosphorus tribromide, and the like. In practicing our invention we have found useful the following general procedures utilizing thionyl chloride (Procedure A) and phosphorus trichloride (Procedure B):

*Procedure A.*—A mixture of the alkylmercaptoalkanoic acid and an excess of thionyl chloride is heated gently on a steam bath until evolution of hydrogen chloride ceases. After removal of the excess thionyl chloride by distillation in vacuo, the acid chloride is distilled in vacuo. Thus, in such a manner there is obtained from 26.0 g. of n-propylmercaptoacetic acid and 31 ml. of thionyl chloride a 92% yield of n-propylmercaptoacetyl chloride distilling at 63–4° C. at 8 mm.

*Procedure B.*—A mixture of the alkylmercaptoalkanoic acid and an excess of phosphorus trichloride is allowed to stand at room temperature overnight and then heated on a steam bath for an hour or two. The crude product is decanted from the syrupy phosphorous acid formed by the reaction and distilled in vacuo to yield the corresponding alkylmercaptoalkanoic acid chloride. By using such a procedure there is obtained from 15.5 g. of 2-methylmercaptobutanoic acid and 6.4 g. of phosphorus trichloride about 15 g. of 2-methylmercaptobutanoyl chloride, B. P. 58–9° C. at 8 mm.

In the preparation of some of the acid chlorides, such as 4-n-propylmercaptobutanoyl chloride and 4-methylmercaptobutanoyl chloride, it has been found convenient to omit the heating period in Procedure B. Further, these two acid chlorides have been obtained in low yields when prepared by Procedure A.

Other alkylmercaptoalkanoic acid chlorides prepared according to the above procedures are listed in the following table:

*Table I*

| Chloride | B. P. (°C.) |
|---|---|
| methylmercaptoacetyl | 49–50°/14 mm. |
| ethylmercaptoacetyl | 61–64°/14 mm. |
| 2-propylmercaptoacetyl | 57–58°/8 mm. |
| n-butylmercaptoacetyl | 83–84°/8 mm. |
| 2-methylmercaptopropanoyl | 48–50°/10 mm. |
| 3-methylmercaptopropanoyl | 65–67°/12 mm. |
| 2-ethylmercaptopropanoyl | 56–57°/8 mm. |
| 4-methylmercaptobutanoyl | 77–79°/7 mm. |
| 4-n-propylmercaptobutanoyl | 106–08°/9 mm. |

III. ALKYLMERCAPTOALKANOIC ANHYDRIDES

These compounds are prepared according to the directions given in the following example:

*Ethylmercaptoacetic anhydride.*—A solution of 100 g. of ethylmercaptoacetic acid and 300 g. of acetic anhydride is refluxed gently for six hours. After the acetic acid and excess acetic anhydride have been removed by distillation under reduced pressure, the main fraction distills at 102–8° C. at 0.3 mm. This fraction is redistilled twice, the second time distilling at 94–6° C. at 0.07 mm., to yield the desired product, ethylmercaptoacetic anhydride.

IV. TESTOSTERONE ALKYLMERCAPTOALKANOATES

These esters can be conveniently prepared by treating testosterone with either an alkylmercaptoalkanoyl chloride in the presence of a basic substance or an alkylmercaptoalkanoic anhydride in the presence of fused potassium acetate. In the isolation and purification of some of the testosterone esters, it is sometimes convenient to make use of the chromatographic adsorption method, which can be applied easily by those skilled in the art. The following examples are presented to illustrate further the preparation of the esters:

A. *Testosterone 2-methylmercaptopropanoate.*—To a cold solution of 0.8 g. of testosterone in 4 ml. of dry pyridine is added with cooling 0.8 ml. of 2-methylmeraptopropanoyl chloride; the resulting mixture is shaken overnight, and the product taken up in ether. After the ether extract has been washed with dilute sulfuric acid and evaporated to dryness, the residue is taken up in petroleum ether (n-pentane fraction). On standing, the petroleum ether solution first yields a small amount of gummy precipitate, which is separated by decantation, and, on further standing, yields about 0.4 g. of crystalline material melting about 117–118° C. Recrystallization of this material from petroleum ether gives the desired product, testosterone, 2-methylmercaptopropanoate, melting at 123–4° C. and having an $[\alpha]_D^{24}$ of $+16.7°$ (this and subsequent optical rotations are determined with a 1% ethanol solution of the ester).

B. *Testosterone ethylmercaptoacetate.*—To a solution of 0.3 g. of testosterone in 4 ml. of pyridine is added 0.8 ml. of ethylmercaptoacetyl chloride. After being shaken overnight, the reaction mixture is poured into water and the product taken up in ether. The ethereal extract is washed with dilute sulfuric acid and then with water, and is evaporated to leave a residue which cannot be crystallized. Also, dissolution of this residue in ether, washing the ethereal solution with dilute sodium carbonate solution and with water, and evaporation of the ether again leads to the formation of syrupy material. This syrup is dissolved in benzene; the benzene solution is brought just to turbidity by the addition of petroleum ether (n-pentane fraction); and the resulting solution is passed through a column of activated alumina. The column is eluted successively with 25 ml. portions of benzene-n-pentane mixtures in ratios of 1 to 1, 2 to 1, and 3 to 1, and finally with 25 ml. of pure benzene. Evaporation to dryness of the resulting eluates yields about 0.3 g. of crystalline product, which after recrystallization from petroleum ether with charcoaling, yields purified testosterone ethylmercaptoacetate, melting at 95–6° C. and having an $[\alpha]_D^{25}$ of $+84.4°$.

This same ester can be prepared by using ethylmercaptoacetic anhydride according to the following procedure: A mixture of 0.5 g. of testosterone, 0.8 g. of fused potassium acetate, and 1 ml. of ethylmercaptoacetic anhydride is heated on a steam bath for two hours. The reaction mixture is treated with water and allowed to stand for about two hours to allow for hydrolysis of the excess anhydride. The product is extracted with ether, and the ether extract is washed with dilute sodium carbonate solution and evaporated to dryness, giving about 0.66 g. of residue. This residue is dissolved in benzene; the benzene solution is brought just to turbidity by the addition of n-pentane; and the resulting solution is passed through a column of activated alumina. The column is eluted with 1 to 3 ether-n-pentane; evaporation of the eluate to dryness yields a residue which, when recrystallized from petroleum ether, weighs 0.45 g. and melts at 92–5° C. Further recrystallization yields a purer sample of testosterone ethylmercaptoacetate, M. P. 95–6° C.

C. *Testosterone 2-ethylmercaptopropanoate.*—To a solution of 0.8 g. of testosterone in 15 ml. of dry ether and 4 ml. of dry pyridine is added a solution of 1 ml. of 2-ethylmercaptopropanoyl chloride in 10 ml. of dry ether. The mixture is refluxed over steam about an hour, water added, and the product extracted with ether. After the ethereal extract has been washed successively with water, dilute sodium carbonate solution, water, dilute sulfuric acid, and water, it is evaporated on a steam bath to yield a yellow-orange syrup. This syrup is taken up in petroleum ether (n-pentane fraction) and the solution passed through a short column of activated alumina. The column is washed with petroleum ether (n-pentane fraction) yielding five eluates, which, on evaporation, leave impure solids. The combined solids are chromatographed two additional times and the resulting product thus obtained melts, after two recrystallizations from aqueous ethanol, at 83–5° C. This ester, testosterone 2-ethylmercaptopropanoate has an $[\alpha]_D^{29}$ of $+87.1°$.

Other testosterone alkylmercaptoalkanoates that can be prepared according to directions given above are listed in the following table:

*Table II*

| | Testosterone Ester | M. P. (°C.) | $[\alpha]_D$ at X° C. |
|---|---|---|---|
| 1 | methylmercaptoacetate | 98–9 | +90.0° at 25° C. |
| 2 | n-propylmercaptoacetate | 68.5–9.5 | +85.0° at 26° C. |
| 3 | (2-propyl)mercaptoacetate | 74–5 | +87.5° at 29° C. |
| 4 | n-butylmercaptoacetate | a | |
| 5 | 3-methylmercaptopropanoate | 84–5 | +84.4° at 29° C. |
| 6 | 2-methylmercaptobutanoate | 118–9.5 | +72.8° at 29° C. |
| 7 | 4-methylmercaptobutanoate | 63.5–4.5 | +86.0° at 27° C. |
| 8 | 4-n-propylmercaptobutanoate | a | |

$a$ = not obtained in a crystalline form.

When other alkylmercaptoalkanoyl halides and alkylmercaptoalkanoic anhydrides are substituted for the acyl halides and acid anhydrides used in the above examples, the corresponding testosterone esters are formed. Moreover, the corresponding esters of other hydroxylated hormones are prepared by substituting for testosterone compounds such as 17-methyltestosterone, estrone, estradiol, stilbestrol, desoxylcorticosterone, and the like. Preparation of such an ester is given below (see Example V).

V. STILBESTEROL ALKYLMERCAPTO-ALKANOATES

These esters can be prepared according to the directions given above for preparation of the corresponding esters of testosterone. By way of illustration the following specific example is given:

*Stilbesterol bis(ethylmercaptoacetate).*—To a solution of 1 g. of stilbestrol in 25 ml. of dry ether and 6 ml. of dry pyridine is added 2 ml. of ethylmercaptoacetyl chloride. The reaction mixture is refluxed for one hour, and then poured into water. The ether layer is separated and washed successively with dilute sulfuric acid solution, dilute sodium carbonate solution, and water. Evaporation of the ether leaves a dark red residue which soon partially crystallizes. The residue is taken up in petroleum ether and ether (about 5 to 1), and the resulting solution is passed through a small column of activated alumina. The alumina is eluted with petroleum ether containing a small amount of ether. Evaporation of the eluate yields about 1.05 g. of yellow crude material, which is chromatographed two additional times and then recrystallized once from petroleum ether and twice from 95% ethanol. The resulting product, stilbestrol bis-(ethylmercaptoacetate), melts at 95–7° C.

Other alkylmercaptoalkanoates of stilbestrol are obtained when, in place of ethylmercaptoacetyl chloride in the above preparation, other alkylmercaptoalkanoyl halides, or alkylmercaptoalkanoic anhydrides, are used.

We claim:

1. A testosterone ester having the formula

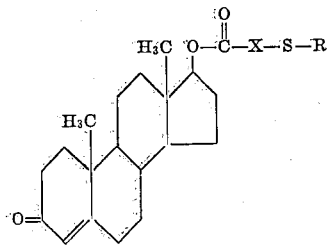

where R is a lower alkyl radical and X is a lower alkylene radical.

2. A testosterone ester having the formula

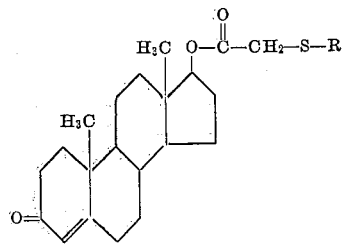

where R is a lower alkyl radical.

3. Testosterone methylmercaptoacetate of the formula

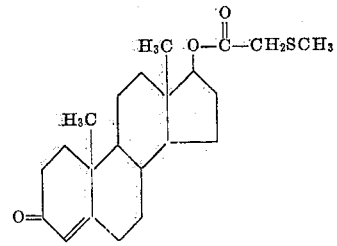

4. Testosterone ethylmercaptoacetate of the formula

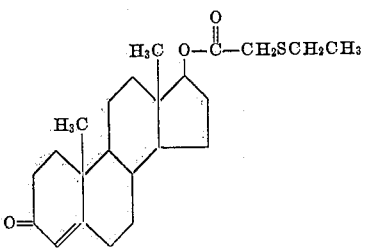

5. Testosterone n-propylmercaptoacetate of the formula

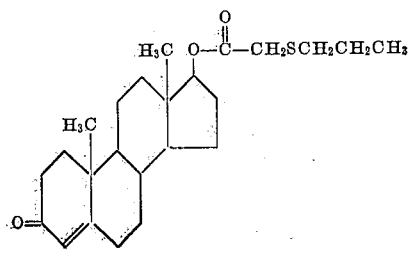

6. A process of preparing an ester of testosterone of the formula

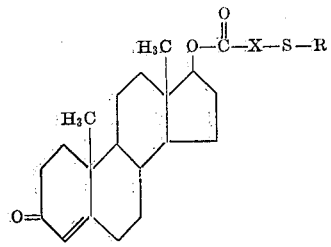

where R is a lower alkyl radical and X is a lower alkylene radical, which comprises reacting a member of the group consisting of lower alkylmercaptoalkanoyl halides and lower alkylmercaptoalkanoic anhydrides with testosterone in the presence of a base.

7. A testosterone ester having the formula

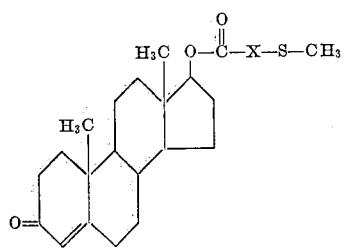

where X is a lower alkylene radical.

8. A testosterone ester having the formula

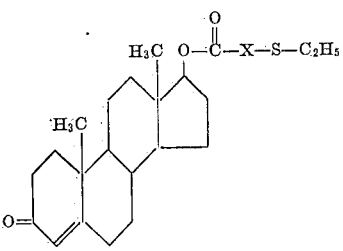

where X is a lower alkylene radical.

9. A testosterone ester having the formula

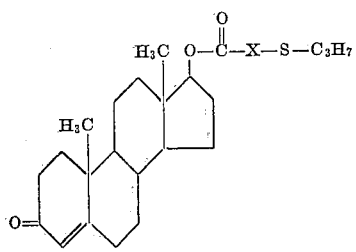

where X is a lower alkylene radical.

10. A lower alkylmercaptoalkanoate of a hydroxylated hormone, said hormone being a member of the group consisting of androgens, estrogens and adrenal cortical hormones.

11. Testosterone (2-propyl)mercaptoacetate of the formula

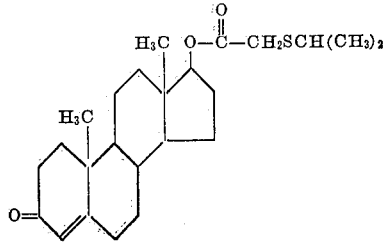

12. Testosterone 3-methylmercaptopropanoate of the formula

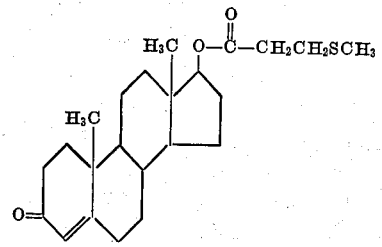

13. A process of preparing an ester of testosterone of the formula

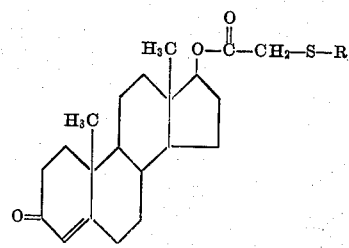

where R is a lower alkyl radical, which comprises reacting a lower alkylmercaptoacetyl halide with testosterone in the presence of a base.

14. A process of preparing an ester of testosterone of the formula

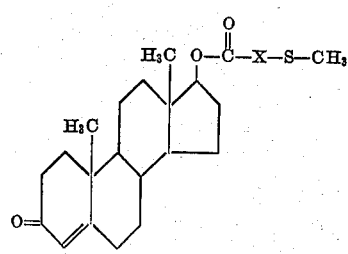

where X is a lower alkylene radical, which comprises reacting a methylmercaptoalkanoyl halide of the formula, $CH_3$—S—X—CO-halogen, with testosterone in the presence of a base.

15. A process of preparing an ester of testosterone of the formula

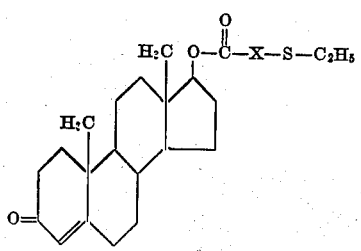

where X is a lower alkylene radical, which comprises reacting an ethylmercaptoalkanoyl halide of the formula, $C_2H_5$—S—X—CO-halogen, with testosterone in the presence of a base.

16. A process of preparing an ester of testosterone of the formula

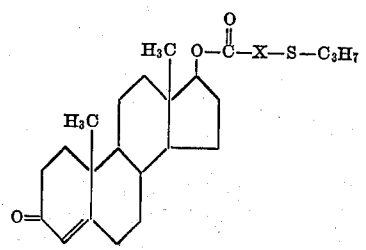

where X is a lower alkylene radical, which comprises reacting a propylmercaptoalkanoyl halide of the formula, $C_3H_7$—S—X—CO-halogen, with testosterone in the presence of a base.

17. A process of preparing testosterone methylmercaptoacetate of the formula

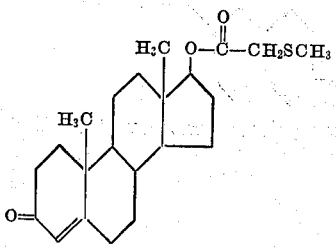

which comprises reacting methylmercaptoacetyl chloride with testosterone in the presence of pyridine.

18. A process of preparing testosterone ethylmercaptoacetate of the formula

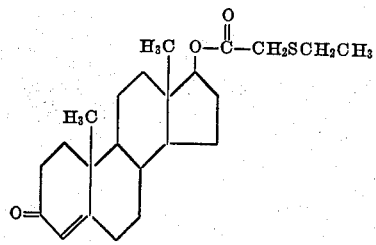

which comprises reacting ethylmercaptoacetyl chloride with testosterone in the presence of pyridine.

19. A process of preparing testosterone n-propylmercaptoacetate of the formula

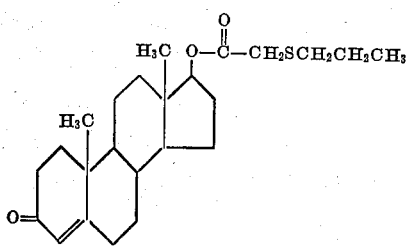

which comprises reacting n-propylmercaptoacetyl chloride with testosterone in the presence of pyridine.

20. A process of preparing (2-propyl)mercaptoacetate of the formula

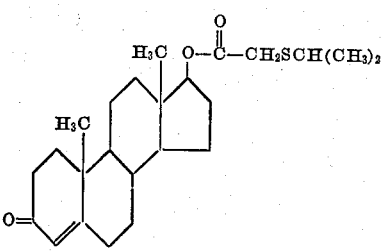

which comprises reacting (2-propyl)mercaptoacetyl chloride with testosterone in the presence of pyridine.

21. A process of preparing testosterone 3-methylmercaptopropanoate of the formula

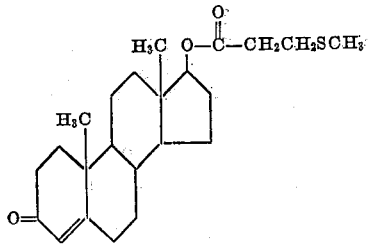

which comprises reacting 3-methylmercapto- propanoyl chloride with testosterone in the presence of pyridine.

ARAM MOORADIAN.
ELMER J. LAWSON.
CHESTER M. SUTER.

REFERENCES CITED

The following references are of record in the file of this patent:

UNITED STATES PATENTS

| Number | Name | Date |
|---|---|---|
| 2,109,400 | Miescher | Feb. 22, 1938 |